(12) United States Patent
Doyon et al.

(10) Patent No.: US 6,425,218 B1
(45) Date of Patent: Jul. 30, 2002

(54) PANEL STRUCTURE

(75) Inventors: Raynald Doyon, St-Georges-Est; Florian Poulin, Charny; Armand Patenaude, Longueuil; Jacques Benmussa, Montréal, all of (CA)

(73) Assignee: 9068-4283 Quebec Inc., Beauceville (CA)

( * ) Notice: Subject to any disclaimer, the term of this patent is extended or adjusted under 35 U.S.C. 154(b) by 0 days.

(21) Appl. No.: 09/252,826

(22) Filed: Feb. 19, 1999

(30) Foreign Application Priority Data

Feb. 23, 1998 (CA) .............................................. 2227687

(51) Int. Cl.[7] .............................. E04B 2/32; E04B 2/90
(52) U.S. Cl. ..................... 52/235; 52/475.1; 52/482; 52/506.04; 52/506.09; 52/508; 52/509; 52/511; 52/546; 52/551; 52/552; 52/553; 52/781.3; 52/800.18; 403/295; 403/298; 403/401; 403/506.01; 403/506.04; 403/506.09; 403/511; 403/482; 403/508
(58) Field of Search ........................... 52/235, 546–547, 52/551, 552, 553, 506.06, 702, 712, 509, 512, 597, 656.1, 656.9, 780, 800.18, 781.3, 657, 508, 475.1; 403/295, 298, 401

(56) References Cited

U.S. PATENT DOCUMENTS

| 3,715,848 A | 2/1973 | Jordan |
| 3,766,698 A | 10/1973 | Dallen |
| 3,866,374 A | 2/1975 | Dallen |
| 4,307,551 A | * 12/1981 | Crandell ...................... 52/235 |
| 4,557,088 A | 12/1985 | Kaminaga |
| 4,561,228 A | 12/1985 | Kaminaga |
| 4,574,546 A | 3/1986 | Gartner |
| 4,590,725 A | 5/1986 | Kaminaga |
| 4,599,838 A | 7/1986 | Kaminaga |
| 4,614,069 A | 9/1986 | Tanikawa et al. |
| 4,625,482 A | 12/1986 | Kaminaga |
| 4,662,136 A | 5/1987 | Tanikawa et al. |
| 4,685,263 A | 8/1987 | Ting |
| 4,783,941 A | 11/1988 | Loper et al. |
| 5,083,405 A | 1/1992 | Miller |
| 5,127,202 A | 7/1992 | Yokota et al. |
| 5,185,979 A | 2/1993 | Azzimonti |
| 5,191,745 A | * 3/1993 | Story ........................ 52/589 |

(List continued on next page.)

FOREIGN PATENT DOCUMENTS

| CA | 1180161 | 1/1985 |
| CA | 1209775 | 8/1986 |
| CA | 2045765 | 6/1991 |
| CA | 1289407 | 9/1991 |
| CA | 2017669 | 7/1992 |
| CA | 2123031 | 11/1994 |
| DE | 93 07 530 | 11/1994 |
| EP | 0 382 278 | 8/1990 |
| FR | 2 763 352 | 11/1998 |
| WO | WO 94/08106 | 4/1994 |
| WO | WO 95/04862 | 2/1995 |

*Primary Examiner*—Yvonne M. Horton
(74) *Attorney, Agent, or Firm*—Oblon, Spivak, McClelland, Maier & Neustadt, P.C.

(57) ABSTRACT

A panel structure for a building panel system to cover an exterior wall of a building. The panel structure comprises identical frame members fixed to the back surface of the panel, one along at least two of its edges. The frame members have mounting portions projecting away from the panel, each two opposed hook. The mounting portions of frame members extending along opposed edges of the panel are in longitudinal mirror symmetry to each other, so the panel structure does not have a specific orientation.

14 Claims, 9 Drawing Sheets

U.S. PATENT DOCUMENTS

| | | |
|---|---|---|
| 5,239,798 A | 8/1993 | Saito |
| 5,253,459 A | 10/1993 | Parinas et al. |
| 5,263,292 A | 11/1993 | Holland et al. |
| 5,285,607 A | 2/1994 | Somerville |
| 5,369,924 A | 12/1994 | Neudorf |
| 5,444,945 A * | 8/1995 | Goodwin ................ 52/65 |
| 5,544,461 A | 8/1996 | Sommerstein |
| 5,860,257 A * | 1/1999 | Gerhaher ................ 52/235 |
| 5,893,245 A * | 4/1999 | Sekigucji et al. ........ 52/235 |
| 6,055,787 A * | 5/2000 | Gerhaher et al. ........ 52/546 |

* cited by examiner

PANEL STRUCTURE

FIELD OF THE INVENTION

The present invention relates generally to panels for covering an external wall of a building, and more particularly to a prefabricated panel structure that has no specific orientation and may be easily mounted on supporting rails fixed on the wall.

BACKGROUND OF THE INVENTION

In large commercial and institutional buildings of certain architectural styles, exterior panels of sheet-like form are used more and more. Those panels can be produced directly in factories and therefore may be rapidly installed on horizontal rails mounted on the facade of the building for this purpose.

Various panel structures have been designed to make such panel walls as easy to install as possible. For example, U.S. Pat. No. 5,544,461 (Sommerstein) discloses a panel mounting structure comprising a plurality of vertically adjacent panels removably mounted on supports, which are in turn mounted on the exterior wall of a building structure. Each panel of the panel structure has an upper edge portion and a lower edge portion each having a downwards open hook adapted to be in engagement with corresponding ribs on the supports. Care must however be exercised in installing such panels as each hook must be engaged with the proper rib. This system is also especially adapted for panels made of lightweight materials such as thin sheets of aluminum or steel, since the edges of the panel itself are preferably folded to form the appropriate engaging portions.

Other examples or related prior art are disclosed in the following documents: U.S. Pat. Nos. 3,715,848; 3,766,698; 3,866,374; 4,307,551; 4,614,069; 4,662,136; 4,685,263; 4,783,941; 5,083,405 and 5,369,924.

There is a need for a panel structure that is easier to install than existing prior art, and more particularly for a panel structure that has no specific orientation.

INCORPORATION BY REFERENCE

The complete disclosure of U.S. patent application Ser. No. 09/253,040 entitled "WINDOW CASE", filed by the same applicant and on the same day as the present application, is incorporated herein by reference.

SUMMARY OF THE INVENTION

An object of the present invention is to provide a panel structure that satisfies the above-mentioned need. Accordingly, the present invention provides a panel structure for covering a wall comprising a panel having a front surface and a back surface, a first edge and a second edge parallel to the first edge. A first frame member is secured to the back surface of the panel and extends along the first edge thereof. A second frame member is secured to the back surface of the panel and extends along the second edge thereof. The first and the second frame member each comprise a universal mounting portion, the mounting portion of the first and second frame member projecting away from the panel in longitudinal mirror symmetry to each other. Each mounting portion defines a first and a second connector. The first connector of each frame member is adapted to engage an upper horizontal support fixed on the wall as the edge of the panel associated with said first connector lies in an uppermost horizontal position. The second connector of each frame member is adapted to engage a lower horizontal support as the edge of the panel associated with said second connector lies in a lowermost horizontal position.

In this manner, the panel structure is vertically mountable on the wall with either one of the first and the second edge lying in an uppermost horizontal position.

Also, for the mounting portion of each of the first and second frame members, the second connector forms a hook adapted to engage a vertically extending engagement member of the lower support, and the first connector comprises a substantially horizontal limb extending from the second connector and projecting away from the panel. The horizontal limb is adapted to rest on a horizontally extending engagement member of the upper horizontal support, whereby the panel structure is mountable on the wall by first slightly tilting the panel and engaging the second connector associated with the edge of the panel lying in the lowermost horizontal position on the vertically extending engagement member of the lower support, and then rotating the panel structure around said vertically extending engagement member toward the wall to engage the first connector associated with the edge of the panel lying in the uppermost horizontal position on the horizontally extending engagement member of the upper horizontal support.

According to a preferred embodiment the panel has a third edge perpendicular to the first and second edges and a fourth edge parallel to the third edge. The panel structure further comprises a third frame member secured to the back surface of the panel and extending along the third edge thereof, and a fourth frame member secured to the back surface of the panel and extending along the fourth edge thereof. The first and the second frame member each comprise a universal mounting portion, the mounting portion of the third and fourth frame member projecting away from the panel in longitudinal mirror symmetry to each other. Each mounting portion defines a first and a second connector. The first connector of each frame member is adapted to engage an upper horizontal support fixed on the wall as the edge of the panel associated with said first connector lies in an uppermost horizontal position. The second connector of each frame member is adapted to engage a lower horizontal support as the edge of the panel associated with said second connector lies in a lowermost horizontal position.

Advantageously, in this embodiment the panel structure is vertically mountable on the wall with either one of the first, the second, the third and the fourth edge lying in an uppermost horizontal position.

Other objects, features and advantages of the invention should become more apparent upon reading the following detailed description of a preferred embodiment thereof taken in conjunction with the accompanying drawings.

NUMERAL REFERENCES OF THE ELEMENTS 2 panel structure
3 existing wall
4 window case
5 panel
6 parapet
8 horizontal support
10 opening in the wall
12 window pane
14 front surface (of a panel)
16 back surface (of a panel)
102 first edge
104 second edge
106 third edge
108 fourth edge
110 first frame member
112 second frame member
114 mounting portion
116 first connector
118 second connector
120 screw
122 third frame member
124 fourth frame member
126 strip of sealing material
127 gasket pocket
128 upper engagement member (of the horizontal support)
130 lower engagement member (of the horizontal support)
132 horizontal portion (of a parapet)
143 vertical portion (of a parapet)
136 frame member (of a parapet)
138 back surface (of a parapet)

DESCRIPTION OF PREFERRED EMBODIMENTS

Figure 1:
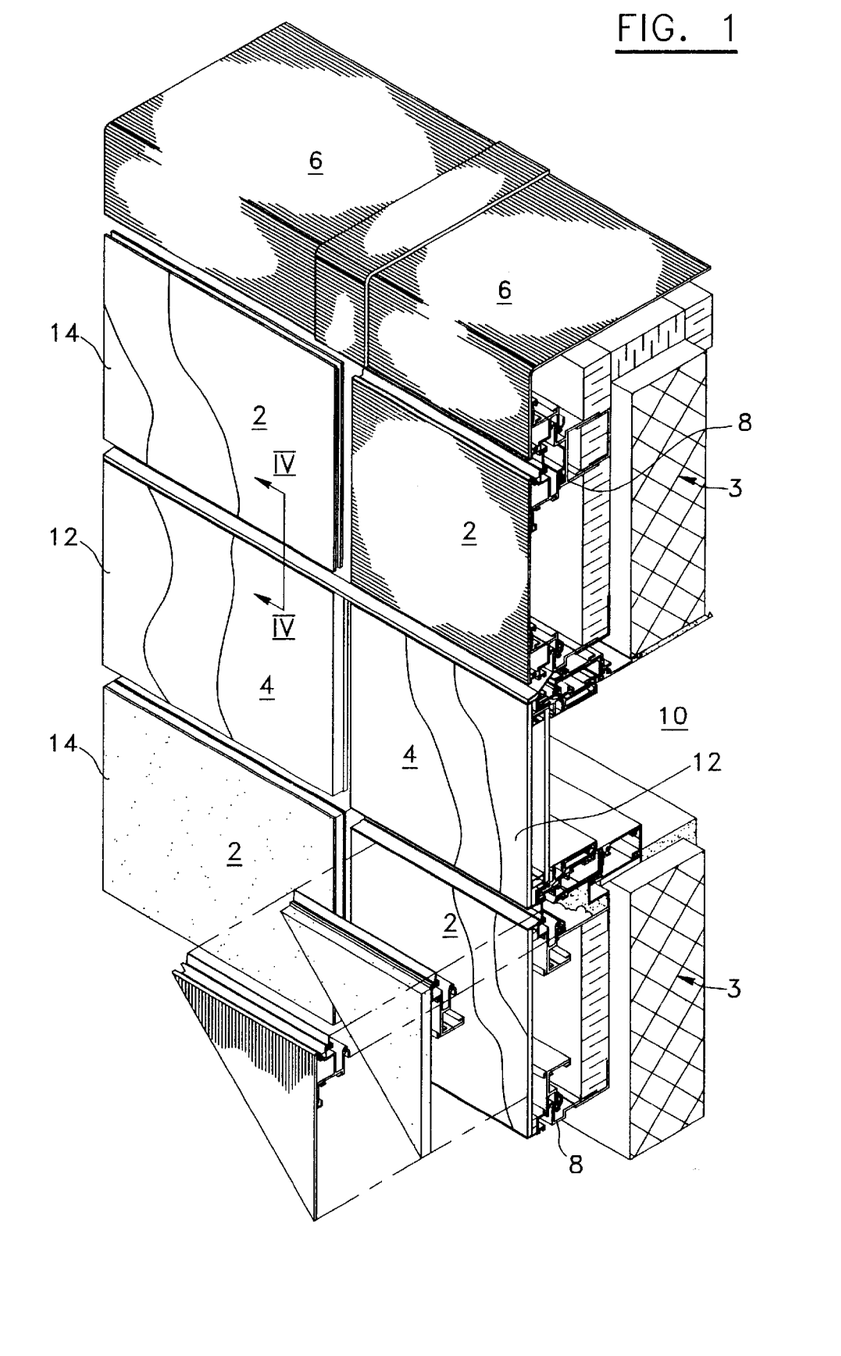
FIG. 1 is a sectional perspective view of a portion of a building panel system including a panel structure according to an embodiment of the present invention.

A portion of a building panel system according to the present invention and covering the upper part of an existing wall (3) is illustrated in FIG. 1. More particularly, this portion shows two rows of panel structures (2) and one row of two window cases (4) disposed between the two rows of panel structures (2). This portion also shows two aluminum parapets (6) mounted on top of the building. The panel structures (2) are hooked side-by-side on horizontal supports (8) fixed on the exterior wall surface (3) of the building and the window cases (4) are mounted in an opening (10) of the wall (3). As can be appreciated, for someone looking at the building, a joint between two panels or a joint between a window and a panel look alike and are not distinguishable because the window pane (12) of a window case (4) is coplanar with the front surface (14) of the adjacent panel structure (2).

Figure 2:
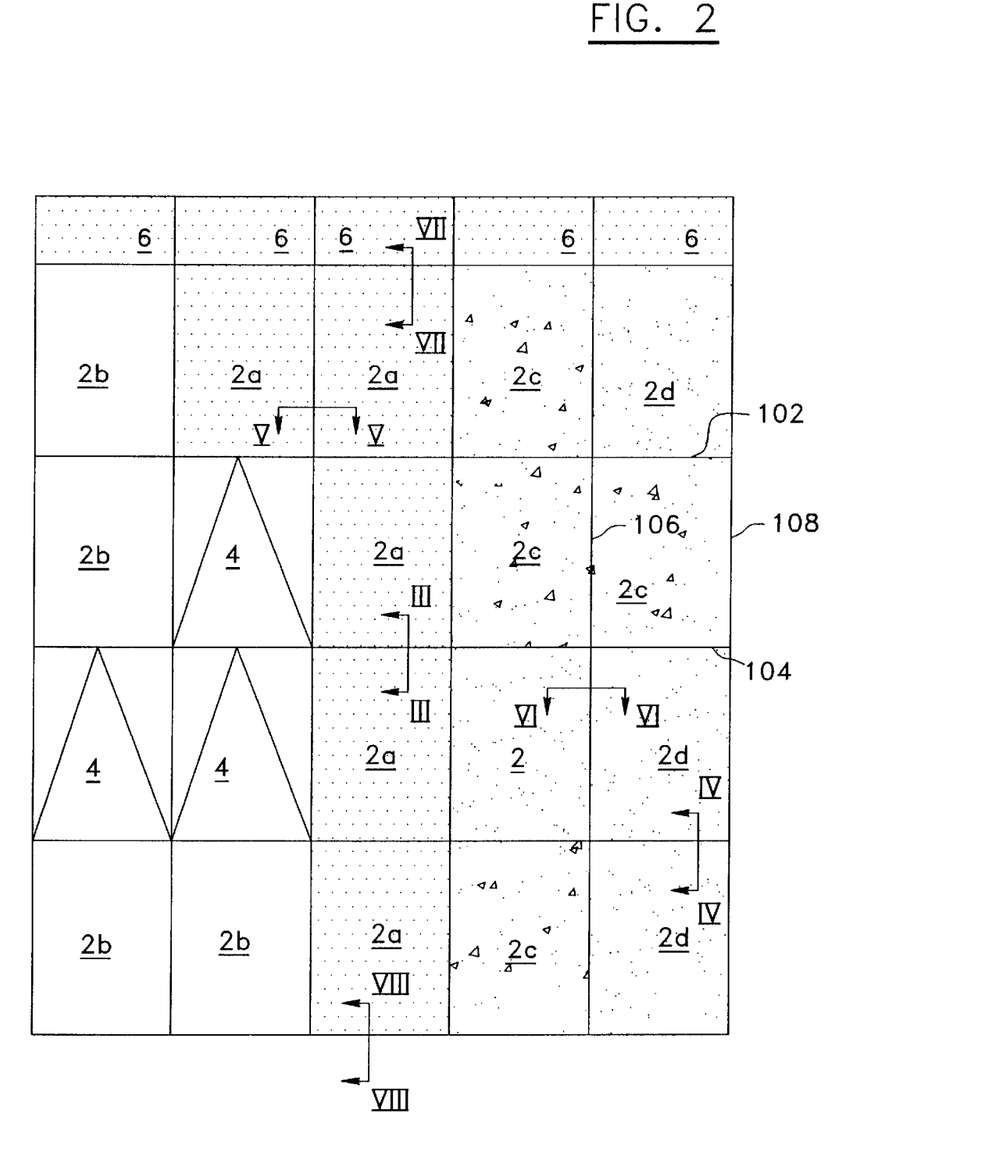
FIG. 2 is a schematic front view of a building panel system comprising panels made of various materials according to another preferred embodiment of the invention.

Another design of a building panel structure according to the present invention is illustrated in FIG. 2. This design comprises four rows of side-by-side panel structures (2), made of different materials selected among aluminum (2a), tympan glass (2b), concrete (2c), granite (2d) or any suitable material. Three window case (4) are mounted between some of those panel structures (2).

Referring to FIG. 2 and any one of FIGS. 3 to 8, each panel structure (2) comprises a panel (5) having a front surface (14), a back surface (16), a first edge (102) a second edge (104) parallel to the first edge (102), a third edge (106) perpendicular to the first and second edges (102,104) and a fourth edge (108) parallel to the third edge (106).

Figure 3:
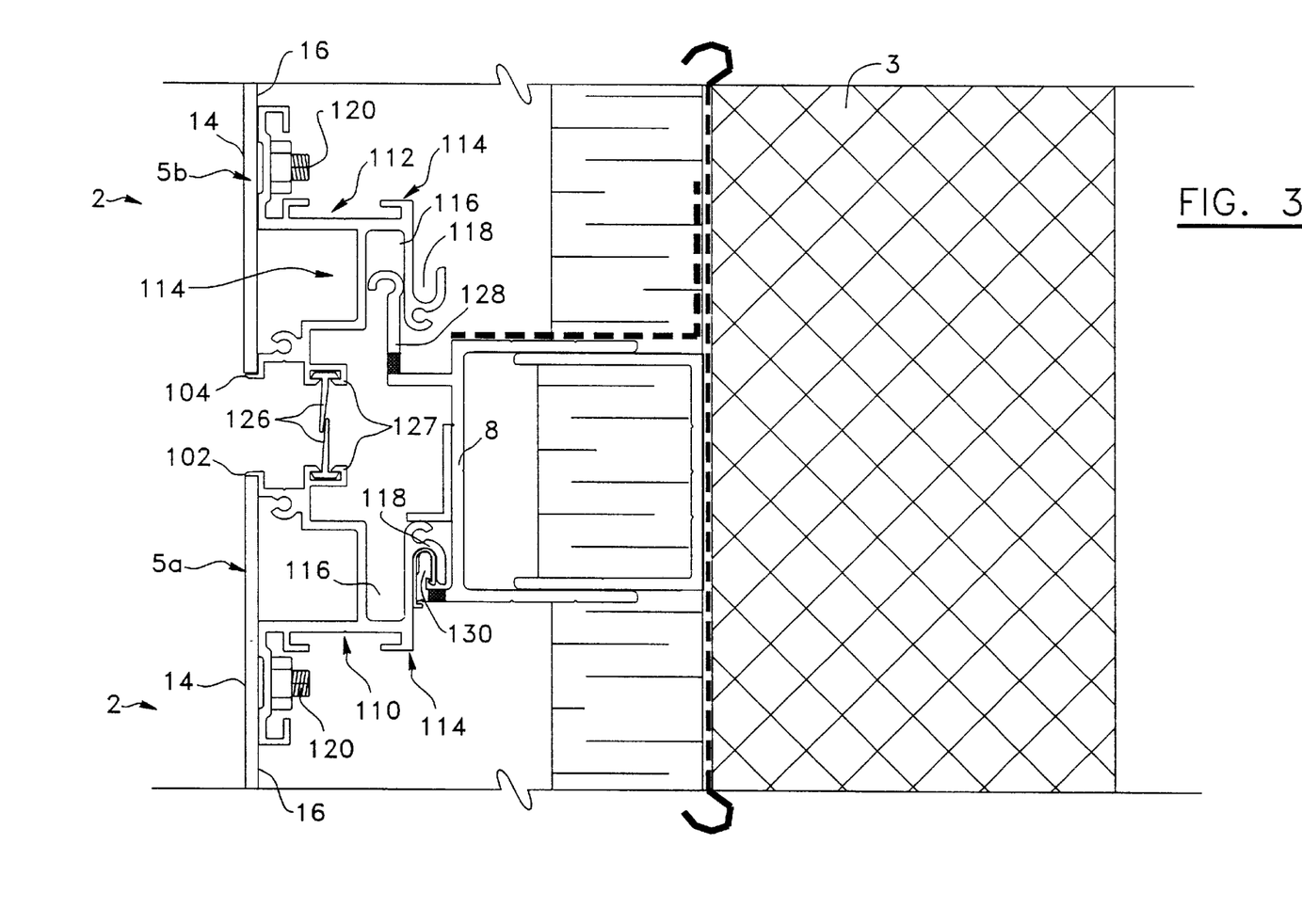
FIG. 3 is a cross-sectional view along line III—III of FIG. 2 showing the junction of two vertically adjacent aluminum panels.
Figure 4:
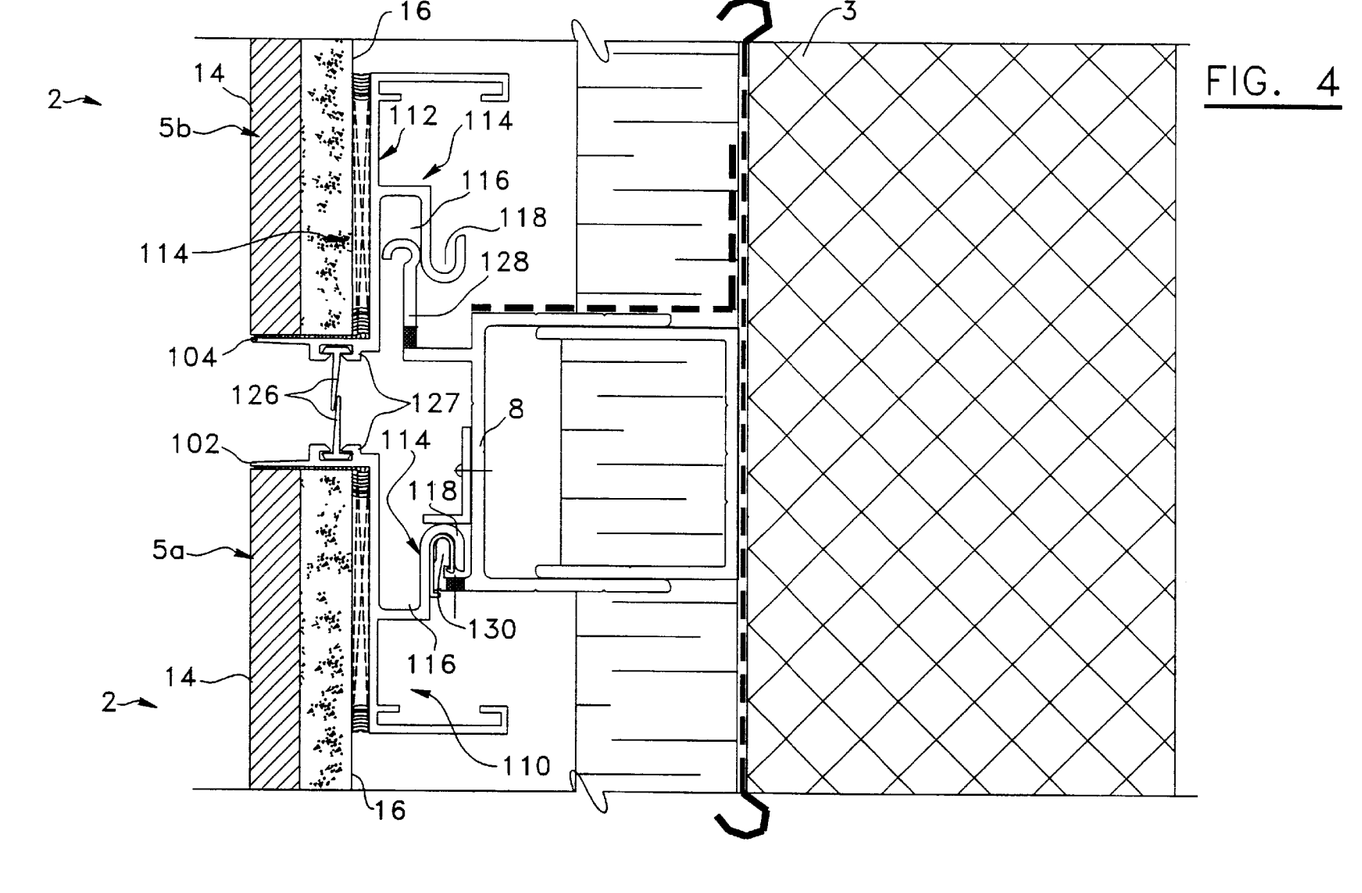
FIG. 4 is a cross-sectional view along line IV—IV of FIG. 2 showing the junction of two vertically adjacent granite panels.

FIGS. 3 and 4 are cross-sectional views of the joint between two vertically adjacent panel structures (2), both made of aluminum in the first case and granite second. A first frame member (110) is secured to the back surface (16) of each panel (5), as may be seen on the lower panel (5a) on both figures, and extends along its first edge (102). A second frame member (112), seen here on the upper panel (5b), is similarly secured to the back surface (16) of each panel (5), and extends along its corresponding second edge (104). Each frame member comprises a universal mounting portion (114), projecting away from the panel (5), each mounting portion (114) defining a first (116) and a second connector (118). The first connector (116) of each frame member is adapted to engage an upper horizontal support (8) fixed on the wall as the edge of the panel associated with said first connector (116) lies in an uppermost horizontal position. The second connector (118) of each frame member is adapted to engage a lower horizontal support (8) as the edge of the panel associated with said second connector (118) lies in a lowermost horizontal position. The mounting portion (114) of a first frame member (110) is in longitudinal mirror symmetry to the mounting portion (114) of the second frame member (112) of the same panel structure (2). In this manner, the panel structures (2) have no "up" or "down" side, as they are vertically mountable on the wall (3) with either one of their first or second edge (102,104) lying in an uppermost horizontal position.

As seen in FIG. 3, for an aluminum panel (5), the frame members (110, 112) are preferably fixed to the back surface (16) of the panel (5) with a screw (120) or with glue. This is also a preferred fastening means for panels (5) made of concrete. For granite (as shown in FIG. 4) or tympan glass panels (5), the frame members (110,112) are preferably bonded on the back surface (16) of each panel (5) with a suitable adhesive. Also preferably, the panel made of granite may be bonded to a first panel made of concrete. Of course, any other appropriate fastening means may be used to fix the frame members (110,112) to panels (5) of any suitable material.

Figure 5:
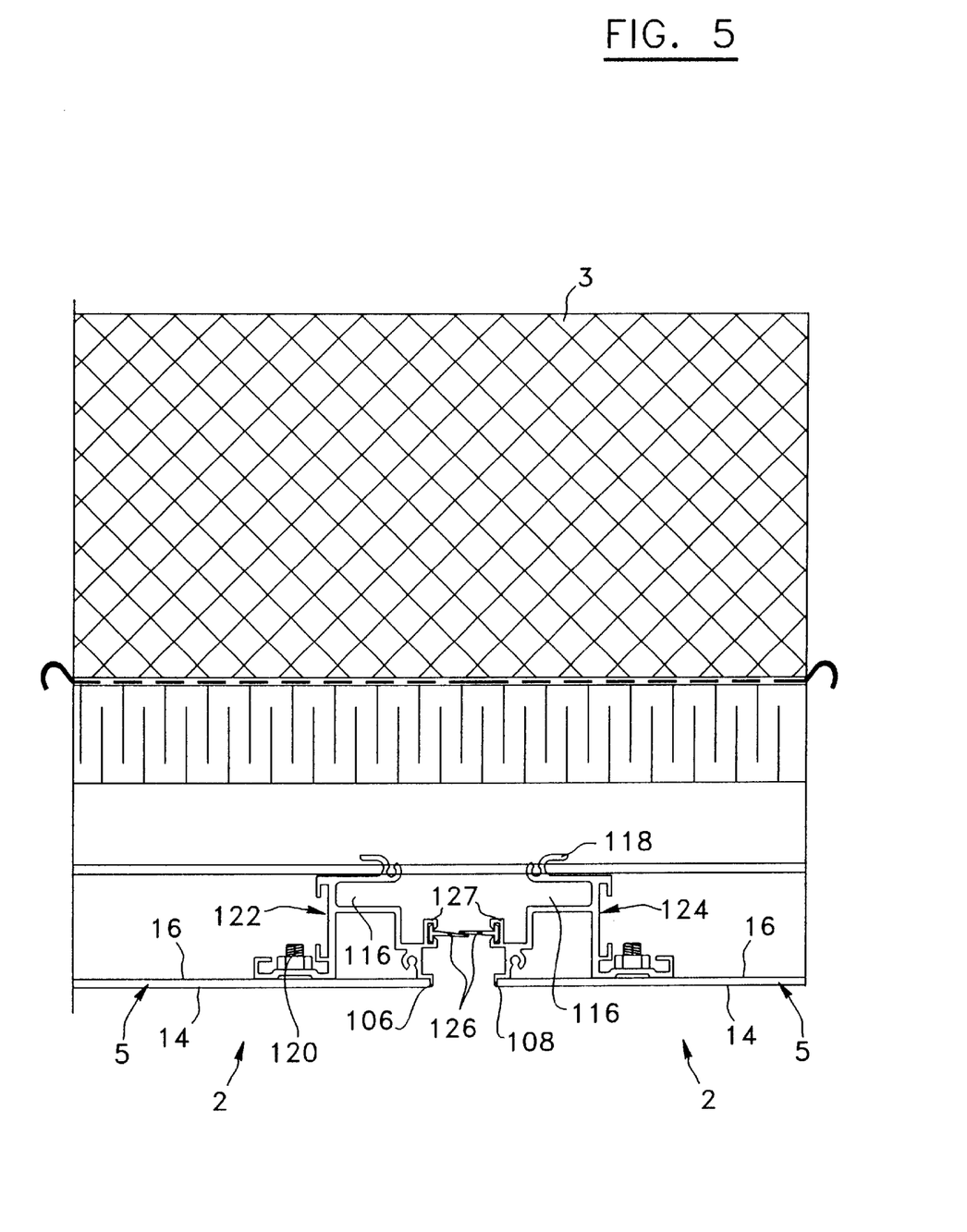
FIG. 5 is a cross-sectional view along line V—V of FIG. 2 showing the junction of two horizontally adjacent aluminum panels.
Figure 6:
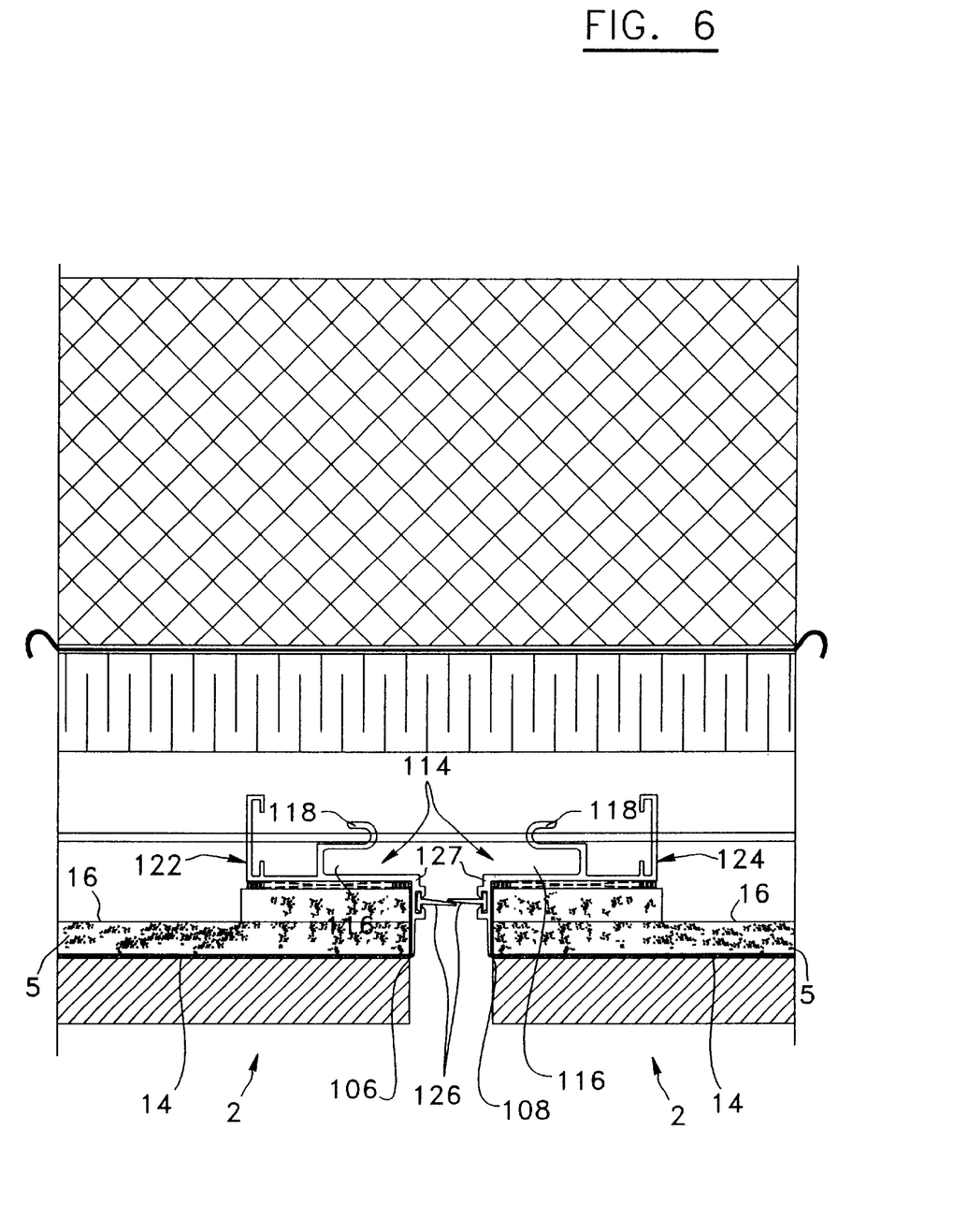
FIG. 6 is a cross-sectional view along line VI—VI of FIG. 2 showing the junction of two horizontally adjacent granite panels.

FIGS. 5 and 6 show the joint between two horizontally adjacent panel structures (2), the panels (5) being made of aluminum in FIG. 5 and of granite in FIG. 6. As can be appreciated, each of the panel structures (2) preferably further comprises a third and a fourth frame member (122, 124). The third frame member (122) is secured to the back surface (16) of the panel (5), and extends along the third edge (106) thereof. The fourth frame member (124) is secured to the back surface (16) of the panel (5) along its fourth edge (108), opposed to the third edge (106). The third and the fourth frame members are each provided with a universal mounting portion (114), identical to the mounting portions of the first and second frame members (110,112). The mounting portions (114) of the third and fourth frame members (122,124) are therefore in longitudinal mirror symmetry to each other. Advantageously, in this embodiment the panel structures (2) have no specific orientation. Each panel (5) is vertically mountable on the wall with either of its edges lying in an uppermost horizontal position.

The panel structures (2) according to the present invention are particularly adapted to be used in a building panel system covering the exterior wall surface (3) of a building, comprising a plurality of horizontal supports (8) fixed to the exterior wall (3). Preferably, each horizontal support (8) is formed as a supporting rail and has an upper engagement member (128) and a lower engagement member (130), as for example illustrated on FIGS. 3 and 4. A plurality of panel structures (2) as defined in any of the particular embodiments described above are mounted side-by-side on the horizontal support (8) to define rows of panel structures (2). In a particular row, the frame member disposed in the uppermost horizontal position has its second connector (118) engaged with the lower engagement member (130) of a horizontal support, and the frame member disposed in the lowermost horizontal position has its first connector (116) engaged with the upper engagement member (128) of the downwardly adjacent horizontal support (8).

In the preferred embodiment illustrated for example in FIGS. 3 and 4, the mounting portion (114) of each frame member has an S-shaped cross-section; which forms two opposed hooks, respectively defining the first (116) and second connector (118). In this manner the panel structures (2) are mounted on the horizontal supports (8) by simply hooking the connectors (116,118) on the upper (128) and lower (130) engagement members of adjacent horizontal supports (8).

Figure 9A:
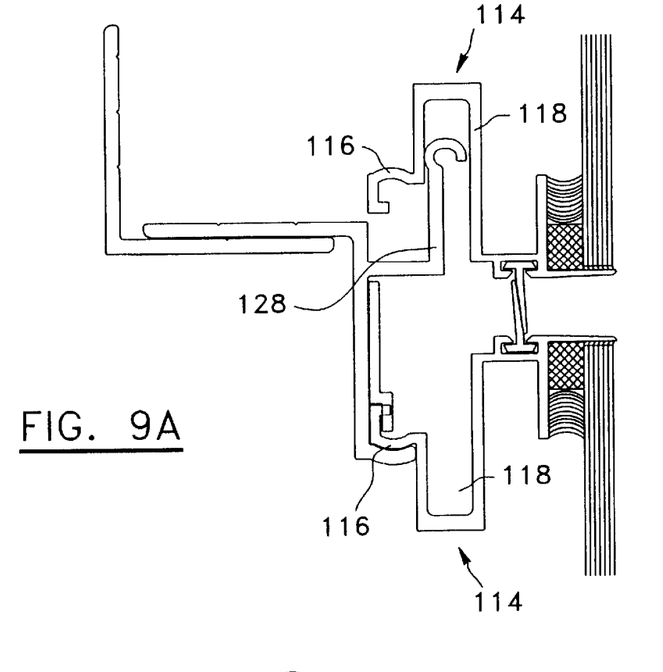
FIG. 9A is a cross-sectional view of two adjacent panels hung on a wall according to another preferred embodiment of the invention.
Figure 9B:
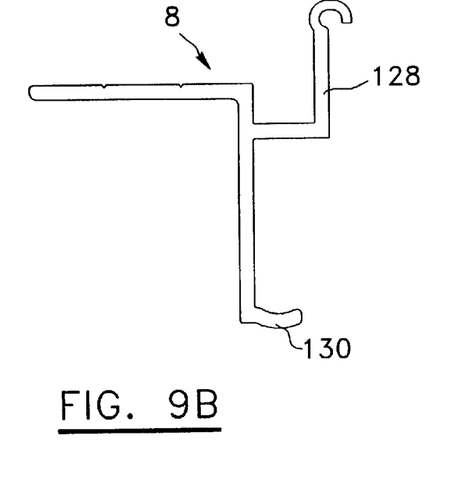
FIG. 9B is a side view of a horizontal support according to the embodiment of FIG. 9A.
Figure 9C:
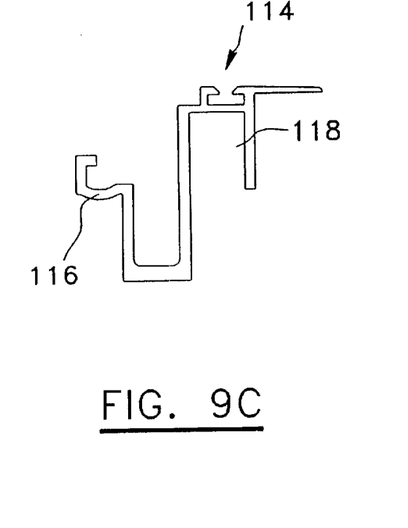
FIG. 9C is a side view of a mounting portion also according to the embodiment of FIG. 9A.

FIGS. 9A, 9B and 9C illustrate another preferred embodiment according to the present invention. In this embodiment, for the mounting portion (114) of each frame member, the second connector (118) forms a hook adapted to engage the upper engagement member (128) of the lower horizontal support (8) which extends vertically for this purpose. The first connector (116) is shaped as a substantially horizontal limb extending from the second connector (118) and projecting away from the panel (5). The lower engagement member (13) has a horizontally extending portion on which the horizontal limb is adapted to rest. In this manner, the panel structure (2) is mountable on the wall (3) by first slightly tilting the panel (5), and engaging the second connector (118) associated with the edge of the panel lying in the lowermost horizontal position on the vertically extending engagement member (128) of the lower support (8), and then rotating the panel structure (2) around the same vertically extending engagement member (118) toward the wall (3) to engage the first connector (116) associated with the edge of the panel lying in the uppermost horizontal position on the horizontally extending engagement member (130) of the upper horizontal support (8).

Referring to anyone of FIGS. 3 to 7, the panel structure (2) preferably further comprises a strip of sealing material (126), fixed to at least one frame member (110,112,122 or 124). Each strip (126) extends outwards from the edge along which the corresponding frame member is secured. More specifically, each strip of sealing material (126) has an end portion inserted in a gasket pocket (127) defined in the corresponding frame member. As evident from FIGS. 3 to 6, when the panel structures (2) are mounted on the wall (3) side by side, the strips (126) from neighbouring panel structures (2) contact each other, filling the space between the panels for a more uniform look. Advantageously, when the panel (5) is provided with a strip (126) on each of its sides, no intermittent space can be seen from outside of the exterior wall (3).

Figure 7:
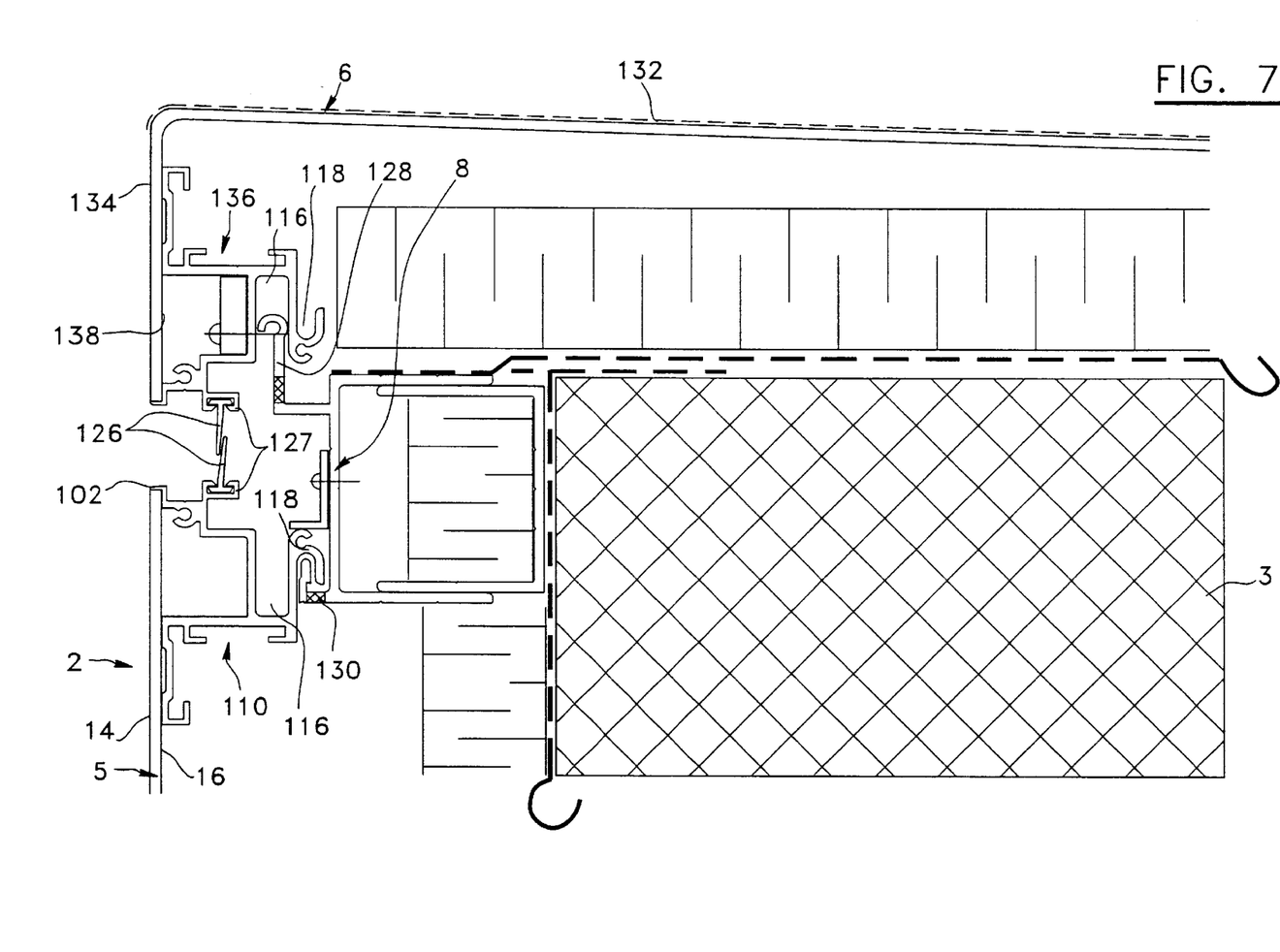
FIG. 7 is a cross-sectional view along line VII—VII of FIG. 2 showing the junction between the head of an aluminum panel and an aluminum parapet.

Referring now to FIG. 7, there is shown the upper portion of a panel structure (2) of the uppermost row of a building panel system according to the present invention. Preferably, the top of the building is covered with a parapet (6), having a horizontal portion (132) covering the top of the building and a vertical portion (134) extending in alignment with the panel structure (2). In the illustrated embodiment, the parapet (6) is provided with a frame member (136) fixed to the back surface (138) thereof, the frame member (136) being similar to those of the panel structures (2). In this manner, the parapet (6) is mounted on the upper engagement member (128) of the higher horizontal support (8), allowing for a smooth transition at the top of the building.

Figure 8:
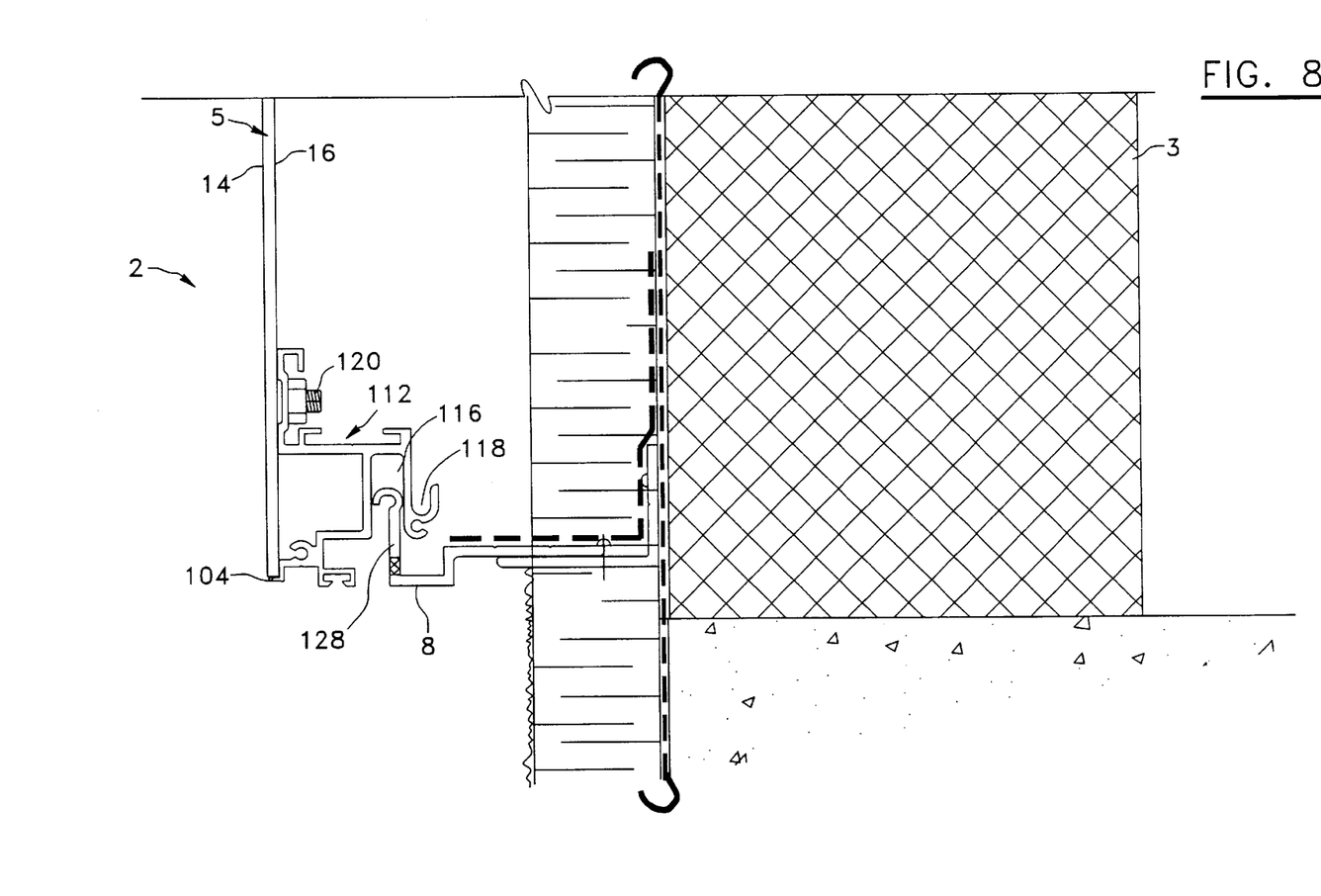
FIG. 8 is a cross-sectional view along line VIII—VIII of FIG. 2 showing the bottom of a wall covered with an aluminum panel.

With reference to FIG. 8, there is shown the lower portion of a panel structure (2) of the lowest row of a building panel system. Preferably, the lowest horizontal support (8) has only an upper engagement member (128), which engages the first connector (116) of the lowest vertically extending frame member of the panel structures (2) of the lowest row of panel structures (2).

As can be appreciated, a panel structure according to the present invention and more particularly to the preferred embodiment described herein has no specific orientation. Each panel is vertically mountable on the wall with either of its edges lying in an uppermost horizontal position. Therefore, the construction of a building panel system with such panel structures can be done very rapidly. Moreover, this system is easily adaptable for panels made of various materials, and even allow to build a panel wall where different panels may be made of different materials.

Of course, numerous modifications could be made to the preferred embodiments disclosed hereinabove without departing from the scope of the invention as defined in the appended claims.

What is claimed is:

1. A panel structure for covering a wall comprising:
 a panel having a front surface and a back surface, a first edge and a second edge parallel to the first edge;
 a first frame member secured to the back surface of the panel and extending along the first edge thereof; and
 a second frame member secured to the back surface of the panel and extending along the second edge thereof, the first and second frame members each comprising a universal mounting portion, the mounting portion of the first and second frame members projecting away from the panel in longitudinal mirror symmetry to each other, each mounting portion defining a first connector and a second connector, the first connector of each mounting portion being adapted to engage an upper horizontal support fixed on the wall as the edge of the panel associated with said first connector lies in an uppermost horizontal position, and the second connector of each mounting portion being adapted to engage a lower horizontal support as the edge of the panel associated with said second connector lies in a lowermost horizontal position;

wherein:
    the panel structure is vertically mountable on the wall with either one of the first and second edges lying in the uppermost horizontal position;
    for the mounting portion of each of the first and second frame members, the second connector forms a hook adapted to engage a vertically extending engagement member of the lower support, and the first connector comprises a substantially horizontal limb extending from the second connector and projecting away from the panel, said horizontal limb being adapted to rest on a horizontally extending engagement member of the upper horizontal support; and
    the panel structure is mountable on the wall by first slightly tilting the panel and engaging the second connector associated with the edge of the panel lying in the lowermost horizontal position on the vertically extending engagement member of the lower support, and then rotating the panel structure around said vertically extending engagement member toward the wall to engage the first connector associated with the edge of the panel lying in the uppermost horizontal position on the horizontally extending engagement member of the upper horizontal support.

2. A panel structure as claimed in claim 1, wherein the panel has a third edge perpendicular to the first and second edges and a fourth edge parallel to the third edge, the panel structure further comprising:
    a third frame member secured to the back surface of the panel and extending along the third edge thereof; and
    a fourth frame member secured to the back surface of the panel and extending along the fourth edge thereof, the third and fourth frame members each comprising a universal mounting portion, the mounting portion of the third and fourth frame members projecting away from the panel in longitudinal mirror symmetry to each other, each mounting portion defining a first connector and a second connector, the first connector of each mounting portion being adapted to engage the upper horizontal support as the edge of the panel associated with said first connector lies in an uppermost horizontal position, and the second connector of each mounting portion being adapted to engage the lower horizontal support as the edge of the panel associated with said second connector lies in a lowermost horizontal position,
    wherein:
        the panel structure is vertically mountable on the wall with either one of the first, second, third and fourth edges lying in an uppermost horizontal position; and
        for the mounting portion of each of the third and fourth frame members, the second connector forms a hook adapted to engage a vertically extending engagement member of the lower support, and the first connector comprises a substantially horizontal limb extending from the second connector and projecting away from the panel, said horizontal limb being adapted to rest on a horizontally extending engagement member of the upper horizontal support.

3. A panel structure as claimed in claim 1, wherein the panel is made of aluminum, and each frame member is secured to the back surface thereof by means of screws.

4. A panel structure as claimed in claim 1, wherein the panel is made of tympan glass, and each frame member is secured to the back surface thereof by bonding.

5. A panel structure as claimed in claim 1, wherein the panel is made of concrete, and each frame member is secured to the back surface thereof by means of screws.

6. A panel structure as claimed in claim 1, wherein the panel is made of granite, and each frame member is secured to the back surface thereof by means of bonding.

7. A panel structure as claim in claim 1, further comprising a strip of sealing material fixed to at least one frame member, each strip extending outwardly from the edge along which the frame member is secured.

8. A building panel system covering the exterior wall surface of a building, comprising:
    a plurality of horizontal supports fixed to the exterior wall, each horizontal support having an upper engagement member and a lower engagement member, and
    a plurality of panel structures as defined in claim 1 mounted side-by-side on the horizontal supports to define rows of panel structures, each panel structure of a row having one of the first and second frame members engaged with the lower engaging member of a horizontal support, and the frame member opposed to the one of the first and second frame member engaged with the upper engaging member of a downwardly adjacent horizontal support.

9. A building panel system covering the exterior wall surface of a building, comprising:
    a plurality of horizontal supports fixed to the exterior wall, each horizontal support having an upper engagement member and a lower engagement member, and
    a plurality of panel structures as defined in claim 2 mounted side-by-side on the horizontal supports to define rows of panel structures, each panel structure of a row having one of the first, second, third or fourth frame members engaged with the lower engaging member of a horizontal support, and the frame member opposed to the one of the first, second, third or fourth frame member engaged with the upper engaging member of a downwardly adjacent horizontal support.

10. A building panel system as claimed in claim 9, wherein a number of the panel structures are made of aluminum.

11. A building panel system as claimed in claim 10, wherein a number of the panel structures are made of tympan glass.

12. A building panel system as claimed in claim 9, wherein a number of the panel structures are made of concrete.

13. A building panel system as claimed in claim 12, wherein a number of the panel structures are made of granite.

14. A building panel system as claimed in claim 9, wherein a first number of the panel structures are made of aluminum, a second number of the panel structures are made of tympan glass, a third number of the panel structures are made of concrete, and a fourth number of the panel structures are made of granite.

* * * * *